US011200655B2

(12) United States Patent
Raij et al.

(10) Patent No.: US 11,200,655 B2
(45) Date of Patent: Dec. 14, 2021

(54) WEARABLE VISUALIZATION SYSTEM AND METHOD

(71) Applicant: Universal City Studios LLC, Universal City, CA (US)

(72) Inventors: Andrew Brian Raij, Orlando, FL (US); Justin Allen Hare, Orlando, FL (US); Gregory Addison Hill, Jr., Orlando, FL (US); Patrick John Goergen, Orlando, FL (US); Tomas Manuel Trujillo, Orlando, FL (US); Martin Evan Graham, Clermont, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/738,788

(22) Filed: Jan. 9, 2020

(65) Prior Publication Data
US 2020/0226738 A1 Jul. 16, 2020

Related U.S. Application Data

(60) Provisional application No. 62/791,735, filed on Jan. 11, 2019.

(51) Int. Cl.
*G06T 7/00* (2017.01)
*H04N 5/225* (2006.01)
(Continued)

(52) U.S. Cl.
CPC ............ *G06T 7/0002* (2013.01); *G01P 15/18* (2013.01); *G02B 27/0101* (2013.01);
(Continued)

(58) Field of Classification Search
CPC ..... G06T 7/0002; G06T 5/006; G06T 19/006; H04N 5/2252; G02B 27/0172;
(Continued)

(56) References Cited

U.S. PATENT DOCUMENTS 5,793,221 A * 8/1998 Aoki ..................... G02F 1/1309
324/760.01
5,793,344 A * 8/1998 Koyama ................ G09G 3/006
345/87

(Continued)

FOREIGN PATENT DOCUMENTS

EP 1643501 B1 6/2013
EP 2834718 B1 10/2018
(Continued)

OTHER PUBLICATIONS

U.S. Appl. No. 16/738,906, filed Jan. 9, 2020, Patrick John Goergen.
(Continued)

*Primary Examiner* — David E Harvey
(74) *Attorney, Agent, or Firm* — Fletcher Yoder, P.C.

(57) ABSTRACT

A wearable visualization system that includes a wearable visualization device. The wearable visualization device includes a housing. A display couples to the housing that displays an image for a user. A camera couples to the housing and captures the image. A computer system receives the image from the camera and compares the image to a master image to determine if the image matches the master image.

20 Claims, 6 Drawing Sheets

(51) Int. Cl.
  *G06T 5/00* (2006.01)
  *G02B 27/01* (2006.01)
  *G06F 3/14* (2006.01)
  *G01P 15/18* (2013.01)
  *G06F 1/16* (2006.01)
  *G06F 3/01* (2006.01)
  *G06T 19/00* (2011.01)

(52) U.S. Cl.
  CPC ..... *G02B 27/0172* (2013.01); *G02B 27/0176* (2013.01); *G06F 1/1626* (2013.01); *G06F 1/1637* (2013.01); *G06F 1/1694* (2013.01); *G06F 3/011* (2013.01); *G06F 3/14* (2013.01); *G06T 5/006* (2013.01); *G06T 19/006* (2013.01); *H04N 5/2253* (2013.01); *G02B 2027/014* (2013.01); *G02B 2027/0138* (2013.01); *G06T 2207/30168* (2013.01)

(58) Field of Classification Search
  CPC ... G02B 27/0176; G02B 27/0101; G06F 3/14; G06F 1/1626; G01P 15/18
  See application file for complete search history.

(56) References Cited

U.S. PATENT DOCUMENTS

| | | |
|---|---|---|
| 6,243,207 B1 | 6/2001 | Kawamura et al. |
| 6,259,565 B1 | 7/2001 | Kawamura et al. |
| 6,384,983 B1 | 5/2002 | Yamazaki et al. |
| 6,600,465 B1 * | 7/2003 | Koyama ............... G09G 3/3648 345/87 |
| 6,683,974 B1 * | 1/2004 | Nagasawa ............ G06T 7/0008 348/125 |
| 7,012,756 B2 | 3/2006 | Takagi et al. |
| 7,019,909 B2 | 3/2006 | Yamazaki et al. |
| 7,350,394 B1 | 4/2008 | Flynn et al. |
| 7,450,332 B2 | 11/2008 | Pasolini et al. |
| 7,495,638 B2 | 2/2009 | Lamvik et al. |
| 7,719,596 B2 * | 5/2010 | Katayama ............ G09G 3/3611 348/333.12 |
| 8,025,581 B2 | 9/2011 | Bryan et al. |
| 8,212,859 B2 | 7/2012 | Tang et al. |
| 8,408,041 B2 | 4/2013 | Ten Kate et al. |
| 8,477,425 B2 | 7/2013 | Border et al. |
| 8,511,827 B2 | 8/2013 | Hua et al. |
| 8,576,276 B2 | 11/2013 | Bar-Zeev et al. |
| 8,610,781 B2 * | 12/2013 | Wei ........................ G09G 3/36 348/191 |
| 8,705,177 B1 | 4/2014 | Miao |
| 8,767,014 B2 | 7/2014 | Vaught et al. |
| 8,768,046 B2 * | 7/2014 | Ernst ..................... G06T 7/251 382/154 |
| 8,810,482 B2 | 8/2014 | Abdollahi et al. |
| 8,866,870 B1 | 10/2014 | Smith |
| 8,867,139 B2 | 10/2014 | Gupta |
| 8,907,865 B2 | 12/2014 | Miyawaki et al. |
| 8,941,559 B2 | 1/2015 | Bar-Zeev et al. |
| 8,964,298 B2 | 2/2015 | Haddick et al. |
| 9,052,505 B2 | 6/2015 | Cheng et al. |
| 9,053,679 B2 * | 6/2015 | Yamazaki ......... H01L 29/78675 |
| 9,088,787 B1 | 7/2015 | Smith et al. |
| 9,183,811 B2 * | 11/2015 | Sasaki .................. G09G 3/006 |
| 9,253,524 B2 | 2/2016 | Kaburlasos et al. |
| 9,268,138 B2 | 2/2016 | Shimizu et al. |
| 9,285,871 B2 | 3/2016 | Geisner et al. |
| 9,286,730 B2 | 3/2016 | Bar-Zeev et al. |
| 9,292,973 B2 | 3/2016 | Bar-Zeev et al. |
| 9,310,591 B2 | 4/2016 | Hua et al. |
| 9,310,610 B2 | 4/2016 | Border |
| 9,316,834 B2 | 4/2016 | Makino et al. |
| 9,342,610 B2 | 5/2016 | Liu et al. |
| 9,354,446 B2 | 5/2016 | Abdollahi et al. |
| 9,360,671 B1 | 6/2016 | Zhou |
| 9,366,870 B2 | 6/2016 | Cheng et al. |
| 9,366,871 B2 | 6/2016 | Ghosh et al. |
| 9,383,582 B2 | 7/2016 | Tang et al. |
| 9,389,423 B2 | 7/2016 | Bhardwaj et al. |
| 9,395,811 B2 | 7/2016 | Vaught et al. |
| 9,402,568 B2 | 8/2016 | Barfield |
| 9,454,007 B1 | 9/2016 | Smith et al. |
| 9,454,010 B1 | 9/2016 | Passmore et al. |
| 9,497,501 B2 | 11/2016 | Mount et al. |
| 9,519,144 B2 | 12/2016 | Lanman et al. |
| D776,110 S | 1/2017 | Gribetz et al. |
| D776,111 S | 1/2017 | Baldassi et al. |
| 9,569,886 B2 | 2/2017 | Akenine-Moller et al. |
| 9,576,399 B2 | 2/2017 | Lo et al. |
| 9,581,819 B1 | 2/2017 | Boggs et al. |
| 9,582,922 B2 | 2/2017 | Lanman et al. |
| 9,588,341 B2 | 3/2017 | Bar-Zeev et al. |
| 9,606,362 B2 | 3/2017 | Passmore et al. |
| 9,638,836 B1 | 5/2017 | Harrison et al. |
| 9,638,921 B2 | 5/2017 | Miller et al. |
| 9,645,396 B2 | 5/2017 | Andes et al. |
| 9,658,457 B2 | 5/2017 | Osterhout |
| 9,658,460 B2 | 5/2017 | Lee et al. |
| 9,667,954 B2 | 5/2017 | Tang |
| 9,685,106 B2 * | 6/2017 | Cha ........................ G09G 3/20 |
| 9,690,371 B2 | 6/2017 | Saito |
| 9,690,374 B2 | 6/2017 | Clement et al. |
| 9,690,375 B2 | 6/2017 | Blum et al. |
| 9,696,552 B1 | 7/2017 | Goergen et al. |
| 9,720,505 B2 | 8/2017 | Gribetz et al. |
| 9,733,477 B2 | 8/2017 | Gupta |
| 9,733,480 B2 | 8/2017 | Baek et al. |
| 9,733,481 B2 | 8/2017 | Carollo et al. |
| 9,741,125 B2 | 8/2017 | Baruch et al. |
| 9,763,342 B2 | 9/2017 | Long et al. |
| 9,773,438 B1 | 9/2017 | Gribetz et al. |
| 9,778,467 B1 | 10/2017 | White et al. |
| 9,839,857 B2 | 12/2017 | Wagner |
| D807,882 S | 1/2018 | Gribetz et al. |
| 9,864,406 B2 | 1/2018 | Miller et al. |
| 9,869,862 B2 | 1/2018 | Cheng et al. |
| 9,874,749 B2 | 1/2018 | Bradski et al. |
| 9,877,016 B2 | 1/2018 | Esteban et al. |
| 9,885,871 B2 | 2/2018 | Abdollahi et al. |
| D812,612 S | 3/2018 | Gribetz et al. |
| 9,928,661 B1 | 3/2018 | Kinstner et al. |
| 9,933,624 B1 | 4/2018 | White et al. |
| 9,939,650 B2 | 4/2018 | Smith et al. |
| 9,958,951 B1 | 5/2018 | Gribetz |
| 9,979,956 B1 * | 5/2018 | D'Amico ................. G06T 7/11 |
| 9,983,697 B1 | 5/2018 | Gribetz |
| 9,984,505 B2 | 5/2018 | Rimon et al. |
| 9,984,510 B1 | 5/2018 | Kinstner et al. |
| 9,990,779 B2 | 6/2018 | Kinstner et al. |
| 9,990,872 B1 | 6/2018 | Gribetz et al. |
| 10,026,231 B1 | 7/2018 | Gribetz et al. |
| 10,026,232 B2 | 7/2018 | Lo et al. |
| 10,037,629 B2 | 7/2018 | Kinstner et al. |
| D825,560 S | 8/2018 | Gribetz et al. |
| D825,561 S | 8/2018 | Gribetz et al. |
| 10,043,305 B2 | 8/2018 | Lo et al. |
| 10,057,968 B2 | 8/2018 | Gribetz et al. |
| 10,075,685 B1 * | 9/2018 | Fulghum ............... H04N 9/3191 |
| 10,082,865 B1 * | 9/2018 | Raynal ............... G02B 27/0093 |
| D830,359 S | 10/2018 | Gribetz et al. |
| 10,088,685 B1 | 10/2018 | Aharoni et al. |
| 10,127,727 B1 | 11/2018 | Yuan et al. |
| 10,168,768 B1 | 1/2019 | Kinstner |
| 10,168,789 B1 | 1/2019 | Soto et al. |
| 10,168,791 B2 | 1/2019 | Gribetz et al. |
| 10,186,088 B2 | 1/2019 | Kinstner et al. |
| 10,212,517 B1 | 2/2019 | Beltran et al. |
| 10,241,545 B1 * | 3/2019 | Richards ................ G06F 1/163 |
| 10,260,864 B2 | 4/2019 | Edwin et al. |
| 10,277,893 B1 * | 4/2019 | Yoon .................... H04N 5/2356 |
| 10,430,939 B1 * | 10/2019 | Levin ................. H04N 5/23296 |
| 10,522,110 B1 * | 12/2019 | Zhang ..................... G02B 7/20 |
| 10,692,473 B1 * | 6/2020 | Fulghum .................. G09G 5/10 |
| 10,785,471 B1 * | 9/2020 | Hunt .................... H04N 13/332 |
| 10,909,895 B2 * | 2/2021 | Hyodo .................... G09G 3/20 |

(56) References Cited

U.S. PATENT DOCUMENTS

| | | | |
|---|---|---|---|
| 2002/0105579 A1* | 8/2002 | Levine | H04N 5/2176 348/187 |
| 2003/0215129 A1* | 11/2003 | Yang | G06T 7/0002 382/149 |
| 2006/0018550 A1* | 1/2006 | Rash | G06T 7/0002 382/218 |
| 2006/0072206 A1 | 4/2006 | Tsuyuki et al. | |
| 2006/0126138 A1* | 6/2006 | Bala | H04N 1/6033 358/518 |
| 2006/0250322 A1 | 11/2006 | Hall et al. | |
| 2007/0035707 A1* | 2/2007 | Margulis | H04N 5/7416 353/122 |
| 2008/0030753 A1* | 2/2008 | Jeong | H04N 9/3194 358/1.9 |
| 2008/0062164 A1* | 3/2008 | Bassi | H04N 9/3194 345/214 |
| 2008/0165084 A1* | 7/2008 | Giegold | G06T 5/006 345/7 |
| 2009/0153673 A1* | 6/2009 | Chu | G06T 15/00 348/207.1 |
| 2011/0157115 A1* | 6/2011 | Shao | G09G 3/006 345/207 |
| 2012/0320100 A1 | 12/2012 | Machida et al. | |
| 2013/0137076 A1 | 5/2013 | Perez et al. | |
| 2014/0118829 A1 | 5/2014 | Ma et al. | |
| 2014/0146394 A1 | 5/2014 | Tout et al. | |
| 2014/0168264 A1 | 6/2014 | Harrison et al. | |
| 2014/0210841 A1* | 7/2014 | Song | G09G 5/02 345/589 |
| 2014/0253701 A1* | 9/2014 | Wexler | H04M 1/72403 348/62 |
| 2014/0364208 A1 | 12/2014 | Perry | |
| 2014/0364209 A1 | 12/2014 | Perry | |
| 2015/0003819 A1 | 1/2015 | Ackerman et al. | |
| 2015/0015796 A1* | 1/2015 | Stahl | H04N 9/3179 348/745 |
| 2015/0049201 A1* | 2/2015 | Liu | H04N 5/7491 348/189 |
| 2015/0103152 A1 | 4/2015 | Qin | |
| 2015/0195517 A1* | 7/2015 | Brown | H04N 9/3185 348/189 |
| 2015/0312561 A1 | 10/2015 | Hoof et al. | |
| 2016/0011341 A1 | 1/2016 | Smith | |
| 2016/0062454 A1 | 3/2016 | Wang et al. | |
| 2016/0093230 A1 | 3/2016 | Boggs et al. | |
| 2016/0097929 A1 | 4/2016 | Yee et al. | |
| 2016/0097930 A1 | 4/2016 | Robbins et al. | |
| 2016/0098095 A1 | 4/2016 | Gonzalez-Banos et al. | |
| 2016/0109710 A1 | 4/2016 | Smith et al. | |
| 2016/0171779 A1 | 6/2016 | Bar-Zeev et al. | |
| 2016/0188943 A1 | 6/2016 | Franz | |
| 2016/0210784 A1 | 7/2016 | Ramsby et al. | |
| 2016/0223822 A1 | 8/2016 | Harrison et al. | |
| 2016/0225191 A1* | 8/2016 | Mullins | G02B 27/0179 |
| 2016/0240013 A1 | 8/2016 | Spitzer | |
| 2016/0346704 A1 | 12/2016 | Wagner | |
| 2016/0349509 A1* | 12/2016 | Lanier | G06F 3/011 |
| 2016/0353089 A1 | 12/2016 | Gallup et al. | |
| 2016/0364907 A1 | 12/2016 | Schoenberg | |
| 2016/0370855 A1 | 12/2016 | Lanier et al. | |
| 2016/0377869 A1 | 12/2016 | Lee et al. | |
| 2016/0379417 A1 | 12/2016 | Mount et al. | |
| 2017/0045736 A1* | 2/2017 | Fu | G02B 27/017 |
| 2017/0053445 A1 | 2/2017 | Chen et al. | |
| 2017/0053446 A1 | 2/2017 | Chen et al. | |
| 2017/0053447 A1 | 2/2017 | Chen et al. | |
| 2017/0059831 A1 | 3/2017 | Hua et al. | |
| 2017/0108696 A1 | 4/2017 | Harrison et al. | |
| 2017/0116950 A1 | 4/2017 | Onal | |
| 2017/0131581 A1 | 5/2017 | Pletenetskyy | |
| 2017/0161951 A1* | 6/2017 | Fix | G06T 5/00 |
| 2017/0161956 A1* | 6/2017 | Fu | G06F 1/1686 |
| 2017/0171538 A1 | 6/2017 | Bell et al. | |
| 2017/0176747 A1 | 6/2017 | Vallius et al. | |
| 2017/0178408 A1 | 6/2017 | Bavor, Jr. et al. | |
| 2017/0188021 A1 | 6/2017 | Lo et al. | |
| 2017/0193679 A1 | 7/2017 | Wu et al. | |
| 2017/0206713 A1 | 7/2017 | Lo et al. | |
| 2017/0208318 A1 | 7/2017 | Passmore et al. | |
| 2017/0212717 A1 | 7/2017 | Zhang | |
| 2017/0220134 A1 | 8/2017 | Burns | |
| 2017/0221264 A1 | 8/2017 | Perry | |
| 2017/0236320 A1 | 8/2017 | Gribetz et al. | |
| 2017/0236332 A1 | 8/2017 | Kipman et al. | |
| 2017/0237789 A1 | 8/2017 | Harner et al. | |
| 2017/0242249 A1 | 8/2017 | Wall et al. | |
| 2017/0255011 A1 | 9/2017 | Son et al. | |
| 2017/0262046 A1 | 9/2017 | Clement et al. | |
| 2017/0262047 A1 | 9/2017 | Saito | |
| 2017/0270841 A1 | 9/2017 | An et al. | |
| 2017/0277256 A1 | 9/2017 | Burns et al. | |
| 2017/0285344 A1 | 10/2017 | Benko et al. | |
| 2017/0293144 A1 | 10/2017 | Cakmakci et al. | |
| 2017/0305083 A1 | 10/2017 | Smith et al. | |
| 2017/0316607 A1 | 11/2017 | Khalid et al. | |
| 2017/0323416 A1 | 11/2017 | Finnila | |
| 2017/0323482 A1 | 11/2017 | Coup et al. | |
| 2017/0336863 A1 | 11/2017 | Tilton et al. | |
| 2017/0337737 A1 | 11/2017 | Edwards et al. | |
| 2017/0345198 A1 | 11/2017 | Magpuri et al. | |
| 2017/0352226 A1 | 12/2017 | Matsuzawa et al. | |
| 2017/0363872 A1 | 12/2017 | Border et al. | |
| 2017/0363949 A1 | 12/2017 | Valente et al. | |
| 2017/0364145 A1 | 12/2017 | Blum et al. | |
| 2018/0003962 A1 | 1/2018 | Urey et al. | |
| 2018/0018515 A1 | 1/2018 | Spizhevoy et al. | |
| 2018/0024370 A1 | 1/2018 | Carollo et al. | |
| 2018/0025575 A1* | 1/2018 | Yukimura | G03B 21/62 463/31 |
| 2018/0032101 A1 | 2/2018 | Jiang | |
| 2018/0033199 A9 | 2/2018 | Eatedali et al. | |
| 2018/0059715 A1 | 3/2018 | Chen et al. | |
| 2018/0059776 A1 | 3/2018 | Jiang et al. | |
| 2018/0095498 A1 | 4/2018 | Raffle et al. | |
| 2018/0104601 A1 | 4/2018 | Wagner | |
| 2018/0124387 A1* | 5/2018 | Zhao | H04N 13/246 |
| 2018/0164594 A1 | 6/2018 | Lee et al. | |
| 2018/0196262 A1 | 7/2018 | Cage | |
| 2018/0203240 A1 | 7/2018 | Jones et al. | |
| 2018/0293041 A1 | 10/2018 | Harviainen | |
| 2019/0094554 A1 | 3/2019 | Benesh et al. | |
| 2019/0294239 A1* | 9/2019 | Suzuki | G02B 27/0179 |
| 2019/0304107 A1* | 10/2019 | Sakuragi | G06T 5/002 |
| 2019/0318706 A1 | 10/2019 | Peng et al. | |
| 2020/0209628 A1* | 7/2020 | Sztuk | G02B 27/0172 |

FOREIGN PATENT DOCUMENTS

| | | |
|---|---|---|
| GB | 2562758 A | 11/2018 |
| JP | 2012141461 A | 7/2012 |
| JP | 5790187 B2 | 10/2015 |
| JP | 5801401 B2 | 10/2015 |
| JP | 2015228050 A | 12/2015 |
| JP | 5913346 B2 | 4/2016 |
| JP | 2016528942 A | 9/2016 |
| JP | 2017522911 A | 8/2017 |
| JP | 6191929 B2 | 9/2017 |
| JP | 6216100 B1 | 10/2017 |
| JP | 6237000 B2 | 11/2017 |
| JP | 2017532825 A | 11/2017 |
| JP | 6248227 B1 | 12/2017 |
| KR | 100630762 B1 | 9/2006 |
| WO | WO-2008044569 A1 | 4/2008 |
| WO | WO-2014106041 A1 | 7/2014 |
| WO | 2018213727 A1 | 11/2018 |
| WO | WO-2018213727 A1 | 11/2018 |

OTHER PUBLICATIONS

U.S. Appl. No. 16/738,908, filed Jan. 9, 2020, Patrick John Goergen.

U.S. Appl. No. 16/738,917, filed Jan. 9, 2020, Douglas Evan Goodner.

(56) References Cited

OTHER PUBLICATIONS

PCT/US2020/013165 Invitation to Pay Additional Fees dated Apr. 2, 2020.
Jaynes, Christopher et al., "Dynamic Shadow Removal from Front Projection Displays", Annual IEEE Conference on Visualization 2001, pp. 175-182, Oct. 21, 2001.
Marijan D. et al., "Multimedia System Verification Through a Usage Model and a Black Test Box", Computer Engineering and Systems (ICCES), pp. 178-182, Nov. 30, 2010.
Rehg J. M. et al., "Projected Light Displays Using Visual Feedback", Control, Automation, Robotics and Vision, 2002, vol. 2, pp. 926-932, Dec. 2, 2002.
Hsieh S-J. et al., "Helmet-Mounted Display Image Quality Evaluation System", IEEE Transactions on Instrumentation and Measurement, vol. 52, No. 6, pp. 1838-1845, Dec. 1, 2003.
Ivan Kastelan et al., "Automated Optical Inspection System for Digital TV Sets", Eurasip Journal on Advances in Signal Processing, vol. 2011, No. 1, pp. 1-14, Nov. 23, 2011.

\* cited by examiner

WEARABLE VISUALIZATION SYSTEM AND METHOD

CROSS-REFERENCE TO RELATED APPLICATION

This application claims priority to and the benefit of U.S. Provisional Application No. 62/791,735, entitled "AUGMENTED REALITY (AR) HEADSET FOR HIGH THROUGHPUT ATTRACTIONS," filed Jan. 11, 2019, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and/or theme parks entertain guests with an assortment of entertainment attractions, restaurants, and rides. For example, amusement parks may include flat rides, roller coasters, water rides, dark rides, Ferris wheels, among others. Amusement park operators are continuously working to enhance the amusement park experience, including the ride vehicle experience. For example, ride vehicles, ride paths, as well as other elements of the ride system, such as lights, speakers, interactive elements, and specialized environments, are continuously upgraded to provide an ever more enhanced sensory experience. Amusement park operators are also incorporating augmented reality and virtual reality into attractions to provide a more interesting and immersive experience.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a wearable visualization system that includes a wearable visualization device. The wearable visualization device includes a housing. A display couples to the housing that displays an image for a user. A camera couples to the housing and captures the image. A computer system receives the image from the camera and compares the image to a master image to determine if the image matches the master image.

In one embodiment, a method of calibrating a wearable visualization system. The method includes detecting an orientation of a wearable visualization device. The method then captures an image produced on a display of the wearable visualization device with a camera. The method may then determine a master image in response to the orientation of the wearable visualization device. The method compares the image to the master image to determine if the image matches the master image.

In one embodiment, a method of calibrating a wearable visualization system. The method includes detecting an operation of a wearable visualization device. The method then captures a test image produced on a display of the wearable visualization device with a camera. The method compares the test image captured by the camera to a master image to determine if the test image matches the master image.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
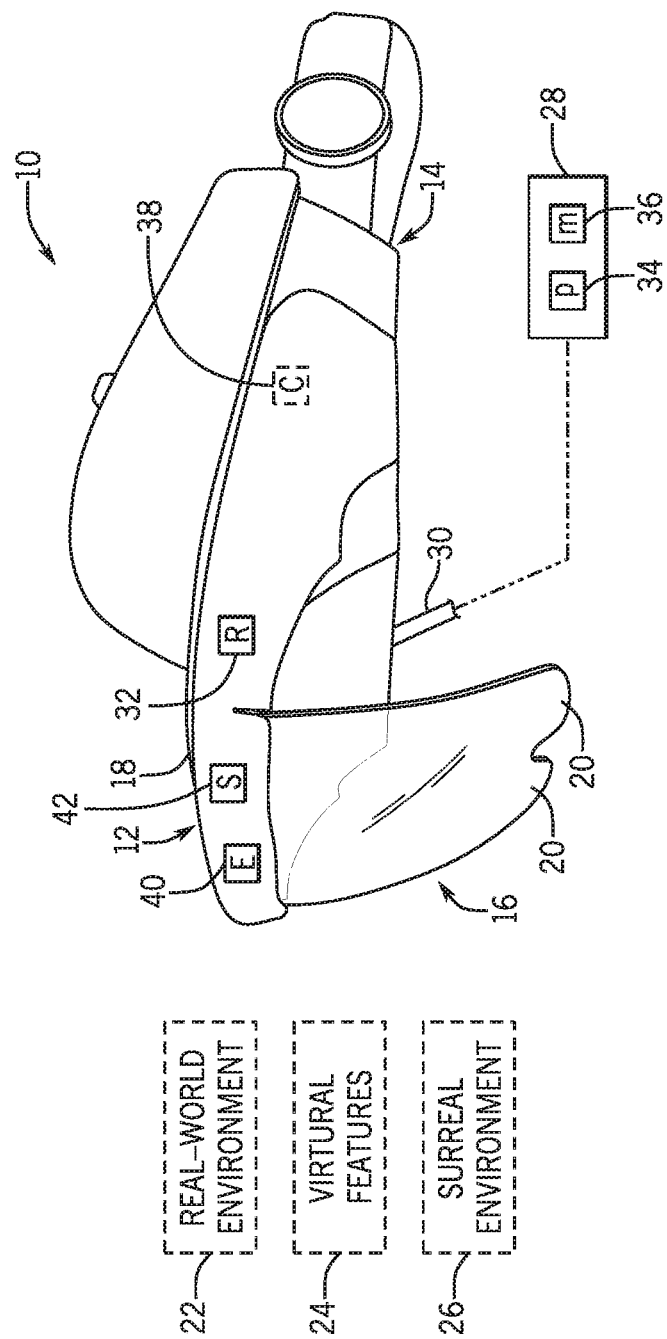
FIG. 1 is a perspective view of a wearable visualization system, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments relate to wearable visualization systems that provide enhanced experiences for guests of an amusement park or theme park. Specifically, these wearable visualization systems provide an augmented reality and/or virtual reality (AR/VR) experience by way of wearable visualization devices. For example, the wearable visualization devices may include a head mounted display (e.g., electronic goggles or displays, eyeglasses), which may be worn by a guest and may be configured to enable the guest to view AR/VR scenes. In particular, the wearable visualization device may be utilized to enhance a guest experience by virtually overlaying features in a real-world environment of the amusement park, by providing adjustable virtual environments to provide different experiences in an amusement park ride (e.g., closed-loop track, dark ride, or other similar ride), and so forth.

Because the wearable visualization device is typically worn by a guest, a ride operator may be unaware of undesirable behavior or the condition of the wearable visualization device. For example, the ride operator may not be aware of problems, such as smudges on displays, reduction in brightness of the displays, malfunctioning pixels (e.g., stuck pixels, dead pixels), stuttering images, dropped frames, incorrect image production, incorrect image coloring, no image production, incorrect timing of image production, incorrect alignment between screen portions (e.g., left and right screens), incorrect alignment with a real-world environment, among others. As will be explained below, the wearable visualization system enables the detection of problems with the wearable visualization devices using cameras. For example, the cameras capture images produced by or on displays of the wearable visualization devices. The wearable visualization system compares these captured images to master images to detect discrepancies that indicate a problem with the wearable visualization device. The ride operator may then be alerted to the problem, and may therefore be able to respond rapidly (e.g., replace, troubleshoot the wearable visualization device).

FIG. 1 is a perspective view a wearable visualization system 10 that enables a user to experience AR and/or VR scenes. The wearable visualization system 10 includes a wearable visualization device 12 (e.g., a head mounted display) that couples to a user. In some embodiments, the wearable visualization device 12 couples to the user with a hat or band that wraps around the user's head. In FIG. 1, the wearable visualization device 12 couples to the user with a band or strap 14.

In the illustrated embodiment, the wearable visualization device 12 includes electronic eyeglasses 16 (e.g., AR/VR eyeglasses, goggles) that couple to a housing 18 of the wearable visualization device 12. The electronic eyeglasses 16 may include one or more displays 20 (e.g., transparent, semi-transparent, opaque; left and right displays) onto which certain virtual images may be overlaid. In some embodiments, the displays 20 may enable the user to view a real-world environment 22 through the displays 20 along with virtual features 24 (e.g., AR features). In other words, the electronic eyeglasses 16 may at least partially control a view of the user by overlaying the virtual features 24 in a line of sight of the user. The displays 20 may include transparent (e.g., see-through) or non-transparent displays that include light emitting diodes (LEDs) or organic light emitting diodes (OLEDs).

In some embodiments, the wearable visualization device 12 may completely control the view of the user (e.g., using opaque viewing surfaces). This surreal environment 26 seen by the viewer may be a real-time video that includes real-world images of a real-world environment 22 that have been electronically merged with one or more virtual features 24 (e.g., VR features). The user may therefore perceive the surreal environment 26 to be the real-world environment 22 overlaid with virtual features 24. In some embodiments, the wearable visualization device 12 may include features, such as light projection features, that project light into one or both eyes of the user so that certain virtual features 24 are superimposed over real-world objects viewable by the user. Such a wearable visualization device 12 may be referred to as a virtual retinal display.

The user may wear the wearable visualization device 12 on an amusement park ride, at a game, and/or in a particular area of the amusement park (e.g., in a themed area of the amusement park). In order to receive the images for the displays 20, the wearable visualization device 12 may couple to a controller or computer system 28 with a wired and/or wireless connection. For example, the wearable visualization device 12 may couple to the computer system 28 with a cable 30 and/or with a wireless transmitter/receiver 32. In embodiments where communication is via wireless connection the connection may be formed with wireless local area networks (WLAN), wireless wide area networks (WWAN), near field communication (NFC), cellular network, among others.

It should be understood that the computer system 28 may not be remotely located from the wearable visualization device 12. For example, the computer system 28 may be imbedded in or directly coupled to the housing 18 of the wearable visualization device 12. The wearable visualization device 12 may be integrated into an amusement park ride. The wearable visualization device 12 may therefore be physically coupled to (e.g., tethered via the cable 30) to a structure (e.g., a ride vehicle of the amusement park ride) to block separation of the wearable visualization device 12 from the structure, as well as to electronically couple it to the computer system 28, which may be coupled to the ride vehicle or other pieces of ride infrastructure.

The computer system 28 includes a processor 34 and a memory 36. The processor 34 may be a microprocessor that executes software for displaying images on the displays 20. The processor 34 may include multiple microprocessors, one or more "general-purpose" microprocessors, one or more special-purpose microprocessors, and/or one or more application specific integrated circuits (ASICs), field-programmable gate arrays (FPGAs), or some combination thereof. For example, the processor 34 may include one or more reduced instruction set computer (RISC) processors.

The memory 36 may include a volatile memory, such as random access memory (RAM), and/or a nonvolatile memory, such as read-only memory (ROM). The memory 36 may store a variety of information and may be used for various purposes. For example, the memory 36 may store images (e.g., test or master images, scenes, VR reality objects, AR objects), and processor executable instructions, such as firmware or software, for the processor 34 to execute. The memory 36 may include ROM, flash memory, a hard drive, or any other suitable optical, magnetic, or solid-state storage medium or a combination thereof. The memory 36 may store data, instructions, and any other suitable data.

As explained above, because the wearable visualization device 12 is typically worn by a guest, the ride operator may be unaware of undesirable behavior or the condition of the wearable visualization device 12. For example, the ride operator may not be aware of problems, such as smudges on the displays 20, reduction in brightness of the displays 20, malfunctioning pixels (e.g., stuck pixels, dead pixels), incorrect alignment between screen portions (e.g., left and right screens). The ride operator may also not be aware of problems with the displays 20 that occur during the ride. For example, the ride operator may not be aware of stuttering images, dropped frames, incorrect image production, incorrect image coloring, no image production, incorrect timing of image production, incorrect alignment with a real-world environment, among others. In order to detect problems with the displays 20 and/or images on the displays 20, the wearable visualization device 12 may include one or more cameras 38 that capture the image(s) provided to the rider or user of the wearable visualization device 12. The captured image is then sent to the computer system 28 for processing and/or comparison to the master or correct image(s) that should be displayed on the displays 20 (e.g., visible to the user). The comparison enables the computer system 28 to detect display problems and to correct those problems automatically and/or flag an operator for maintenance operations (e.g., inspection, cleaning, or replacement). For example, after the computer system 28 detects a problem and is unsuccessful in correcting the problem, the computer system 28 may activate a light 40, a speaker 42, or a combination thereof to notify the operator of a problem. In response, the operator may inspect, clean, and/or replace the wearable visualization device 12.

Figure 2:
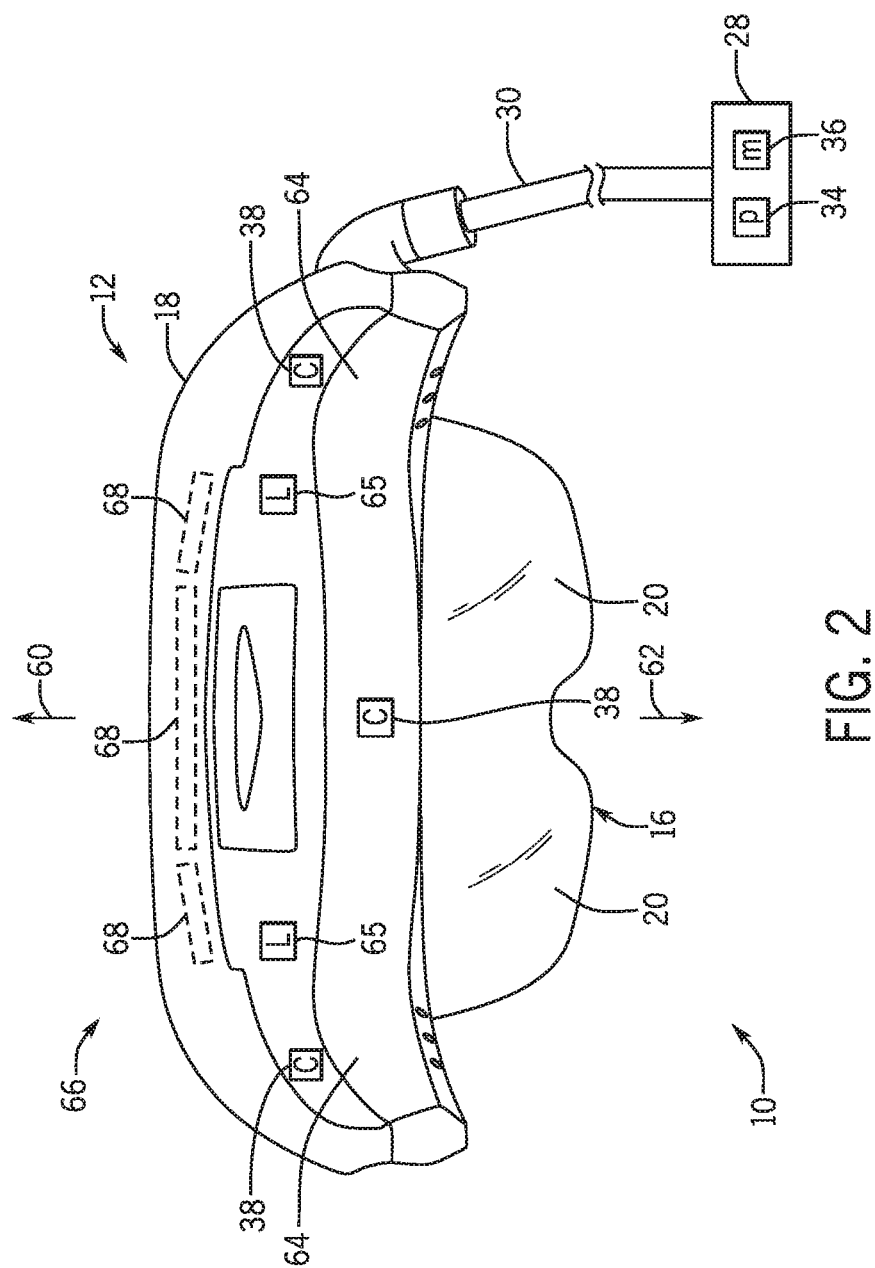
FIG. 2 is a rear view of the wearable visualization system of FIG. 1, in accordance with an embodiment of the present disclosure.

FIG. 2 is a rear view of the wearable visualization device 12 of FIG. 1. As explained above, the wearable visualization device 12 includes one or more cameras 38 (e.g., color camera, gray scale camera; optical detector). These cameras 38 may be forward facing in a direction 60 toward the displays 20 and/or rearward facing in direction 62 towards the wearer or user. For example, there may be both forward and rearward facing cameras 38. The forward facing cameras 38 are positioned to see the actual image(s) generated on the displays 20. The rearward facing cameras 38 are positioned to capture image(s) in the user's eyes. The cameras 38 may be positioned on wings or sides 64 of the housing 18 or centrally located on the housing 18. In FIG. 2, three cameras 38 are illustrated, but it should be understood that there may a different number of cameras 38 (e.g., 1, 2, 3, 4, 5 or more). For example, the wearable visualization device 12 may include a camera 38 for each display 20 or user's eye. However, in some embodiments the wearable visualization device 12 may have only one camera 38. For example, a single centrally located camera 38 (e.g., wide angle camera) with a field of view sufficient to see and capture image(s) on all of the displays 20. In some embodiments, the wearable visualization device 12 may include lights 65 (e.g., infrared lights) that illuminate the user's eye(s) to enable the camera 38 to capture the image reflected in the user's eye(s).

In addition to the cameras 38, the wearable visualization device 12 may also include a tracking system 66 with multiple sensors 68. These sensors 68 enable the tracking of the position and orientation of the wearable visualization device 12, and therefore the position and orientation of the displays 20. The ability to determine where a user is looking with the wearable visualization device 12 enables the computer system 28 to identify discrepancies between what the user is seeing in the displays 20, when looking in a particular direction, and what the user should be seeing in the displays 20, when looking in that direction. The sensors 68 may also detect when the wearable visualization device 12 is not in use, thus enabling the computer system 28 to run (e.g., automatically run) diagnostics tests between uses (e.g., between the end of a ride and the start of the next one). For example, the sensors 68 may include a position sensor (e.g., Hall-effect sensor) and/or an orientation sensor (e.g., inertial measurement unit [IMU]). The computer system 28 may receive signals from the sensors 68 indicate that the wearable visualization device 12 is stored in a storage location (e.g., container). In particular, the position sensor may detect that the wearable visualization device 12 within a threshold distance of and/or in contact with a surface of the container and/or the orientation sensor may detect that the wearable visualization device 12 is oriented relative to a gravity vector in a manner that is consistent with the wearable visualization device 12 being stored in the container. Then, the computer system 28 may automatically run or initiate the diagnostics tests in response to the computer system 28 determining that the wearable visualization device 12 is stored in the container. The computer system 28 may automatically run or initiate the diagnostics tests at other times, such as in response to the ride vehicle and/or the wearable visualization device 12 entering the unloading zone or other area of the attraction in which the wearable visualization device 12 is not used to present virtual features to the user. The one or more sensors 68 may include any suitable orientation and/or position sensors (e.g., accelerometers, magnetometers, gyroscopes, Global Positioning System [GPS] receivers), motion tracking sensors (e.g., electromagnetic and solid-state motion tracking sensors), inertial measurement units (IMU), presence sensors, and others. In addition, the one or more sensors 68 and/or the computer system 28 may also track operation information of a ride vehicle, including but not limited to, position, yaw, pitch roll, and velocity of the ride vehicle and coordinate that information to the images that should be produced on the displays 20.

Figure 3:
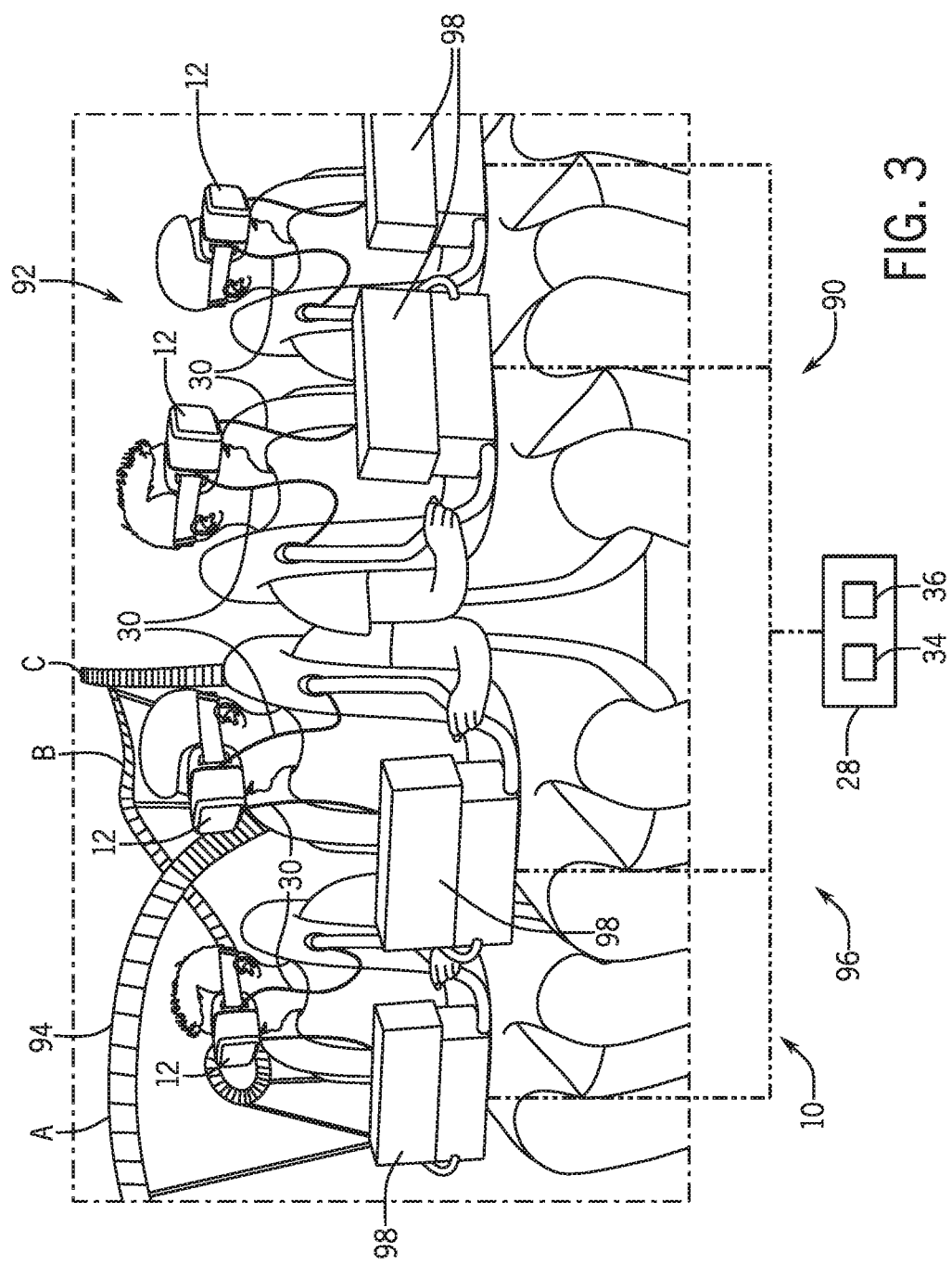
FIG. 3 is a view of a ride with the wearable visualization system, in accordance with an embodiment of the present disclosure.

FIG. 3 is a view of a ride 90 with a ride vehicle 92. The ride 90 includes a vehicle path (e.g., a closed-loop track or a system of closed-loop tracks 94). The tracks 94 may be provided as an infrastructure on which the ride vehicle 92 may travel with passengers 96 (e.g., users). It should be appreciated that the ride 90, ride vehicle 92, number of passengers 96 are exemplary and may differ between embodiments. As the ride vehicle 92 travels along the tracks 94, the passengers 96 may be provided a moving tour of scenery (e.g., themed environment that may include fixed equipment, building layouts, props, decorations, and so forth corresponding to the theme). The scenery may include the environment surrounding the ride 14 and/or the environment within an infrastructure that may fully or partially house the ride 14.

In order to enhance the ride experience, the ride 90 incorporates the wearable visualization devices 12 of the wearable visualization system 10. As the ride vehicle 92 travels along the tracks 94, the wearable visualization system 10 may coordinate AR/VR images or features, such as AR/VR objects that are shown to the passengers 96 on the displays 20 of the wearable visualization devices 12. These AR/VR objects may change as the user changes the orientation of the wearable visualization devices 12 while on the ride. For example, the passenger 96 may change the orientation of the wearable visualization devices 12 by turning their head and moving their head up and down. The AR/VR objects may also change as the ride vehicle 92 changes physical position (e.g., rotates, rolls, moves along tracks 94). The AR/VR objects may also change for stationary rides as well in response to a designated timeline for the ride (e.g., storyline). These changes are provided by the computer system 28 to the displays 20 of the wearable visualization devices 12. As explained above, the computer system 28 may couple to the wearable visualization devices 12 with a wired and/or wireless connection. In FIG. 3, the wearable visualization devices 12 couple to the ride vehicle 92 with one or more cables 30 that provide electronic communication to the computer system 28. The computer system 28 may coordinate visual and/or sound presentations provided to the passengers 96 wearing the wearable visualization devices 12 through these cables 30. These cables 30 may also provide feedback to the computer system 28 on the operation of the wearable visualization devices 12.

As explained above, a ride operator may be unaware of undesirable behavior or the condition of the wearable visualization device 12. For example, the ride operator may not be aware of problems, such as smudges on the displays 20, reduction in brightness of the displays 20, malfunctioning pixels (e.g., stuck pixels, dead pixels), incorrect alignment between screen portions (e.g., left and right screens). The ride operator may also not be aware of problems with the displays 20 that occur during the ride. For example, the ride operator may not be aware of stuttering images, dropped frames, incorrect image production, incorrect image coloring, no image production, incorrect timing of image production, incorrect alignment with a real-world environment, among others. The computer system 28 is able to detect these problems through feedback from cameras 38 (FIGS. 1 and 2) coupled to the wearable visualization devices 12. For example, the computer system 28 may continuously check the operation of the wearable visualization devices 12 during a ride using feedback from the cameras 38. In another embodiment, the computer system 28 may periodically check the operation of the wearable visualization devices 12 by requesting feedback from the cameras 38 at specific locations on the ride 90. For example, the computer system 28 may receive feedback when the ride vehicle 92 reaches points A, B, and C along the track 94. For stationary rides, the computer system 28 may receive feedback at certain time points as measured from a specific time point (e.g., start of the ride).

The captured images from the cameras 38 are sent to the computer system 28 for processing and/or comparison to the master or correct image(s) that should be displayed to the user in the current orientation of the wearable visualization device 12, at a specific location along the ride, and/or time on the ride. The comparison enables the computer system 28 to detect display problems and to correct those problems automatically and/or flag an operator for inspection, cleaning, or replacement. The computer system 28 may also perform diagnostic checks of the wearable visualization devices 12 between rides or at other times (e.g., end of the day). The computer system 28 may run these diagnostic checks after detecting that the wearable visualization device 12 is not in use through feedback from one or more of the sensors 68. For example, one or more of these sensors 68 may detect that the wearable visualization device 12 is within a container 98 (e.g., pouch, box) that couples to the ride vehicle 92 for storage of the wearable visualization device 12. The sensors 68 may also detect disconnection of the wearable visualization device 12 from the user (e.g., pulled off head) or the absence of movement of the wearable visualization device 12 and correlate this feedback to an appropriate time to perform a diagnostic check (e.g., automatically run the diagnostic check).

Figure 4:
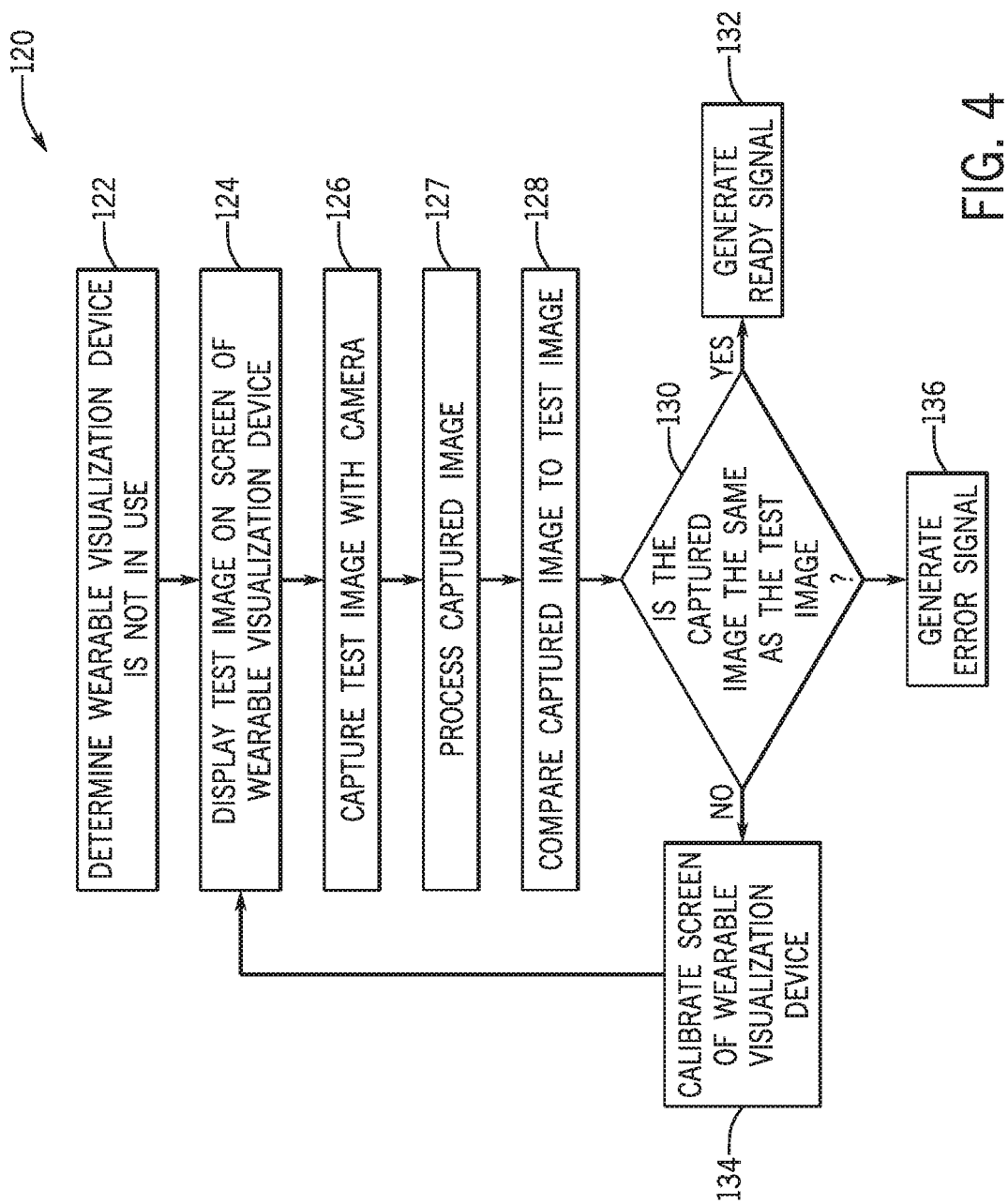
FIG. 4 is a flowchart of a method for testing a wearable visualization system prior to the start of a ride, in accordance with an embodiment of the present disclosure.

FIG. 4 is a flowchart of a method 120 for testing a wearable visualization system 10 prior to the start of a ride. The methods disclosed herein include various steps represented by blocks. It should be noted that at least some steps of the methods may be performed as an automated procedure by a system, such as by the computing system 28. Although the flow charts illustrates the steps in a certain sequence, it should be understood that the steps may be performed in any suitable order and certain steps may be carried out simultaneously, where appropriate. Additionally, steps may be added to or omitted from the methods.

The method 120 begins by determining if the wearable visualization device 12 is not in use, step 122. As explained above, the computer system 28 may receive feedback from one or more sensors 68. Feedback from the sensors 68 enable the computer system 28 to determine that the wearable visualization device 12 is not being used by a user during a ride. After determining that the wearable visualization device 12 is not in use, the computer system 28 controls the wearable visualization device 12 to display a test image(s) on the displays 20, step 124. The test images may be a single image or a sequence of images that display one or more patterns, colors, shapes, or combinations thereof. The cameras 38 capture these images as they are displayed on the displays 20 and transmit the captured images to the computer system 28, step 126. After capturing the image or images, the method 120 may process the captured image or images, step 127. For example, the cameras 38 may capture geometrically distorted images, grainy images, faint reflections on the displays 20 from the surroundings, among others. The processing may therefore transform the image from a distorted image seen from the angle of the camera 38 to images that the user would see looking directly at the displays 20. The computer system 28 is then able to compare the captured image to the test image (e.g., master image) to determine differences, step 128. The comparison may reveal a variety of problems with the displays 20. For example, the comparison may reveal smudges on the displays 20 (through the detection of blurred portions of the captured image), reduction in brightness of the displays 20, malfunctioning pixels (e.g., stuck pixels, dead pixels), incorrect image production, incorrect image coloring, no image production, incorrect alignment between the displays 20, among others.

After comparing the images, the method 120 determines if the captured image is the same as (e.g., matches, is substantially similar to) the test image, step 130. If the captured image is the same as the test image (e.g., in response to the images being the same), the method 120 generates a ready signal, step 132. The ready signal may be a visual signal (e.g., solid or flashing green light) and/or audio signal generated on the wearable visualization device 12 or on another device (e.g., tablet, computer, cellphone, watch) that is accessible to the ride operator. In some embodiments, if the captured image is substantially similar to (e.g., within a range of one or more metrics; in response to the captured image being substantially similar to) the test image, the method 120 may still generate the ready signal. For example, if the captured image is within a threshold color difference, brightness, number of dead pixels, blurriness (e.g., from smudging), or some combination thereof, the method 120 will still generate the ready signal.

If the captured image does not match the test image (e.g., in response to the captured image not matching the test image), the method 120 continues by calibrating the wearable visualization device 12, step 134. In some embodiments, the method 120 may extract calibration parameters before calibrating the wearable visualization device 12. For example, the computer system 28 may adjust the coloring, image focus, among others. The method 120 may then repeat the process of displaying the test image (step 124), capturing the image (step 126), and comparing the captured image to the test image (step 128). If the captured image still does not match the test image, the method 120 may continue by generating an error signal, step 136. The error signal may be a visual signal (e.g., red flashing light) and/or audio signal (e.g., request for inspection) generated on the wearable visualization device 12 or on another device (e.g., tablet, computer, cellphone, watch) accessible to the ride operator. The ride operator may then inspect, clean, and/or replace the wearable visualization device 12. In some embodiments, in response to the captured image being different (e.g., significantly different) from the test image (e.g., the captured image indicates that no image is displayed, that a large portion of the display has smudges, that a large portion of the pixels are malfunctioning) at the comparison step (130), the method 120 may skip the calibration step (step 134) and may instead proceed to the error signal step (step 136).

Figure 5:
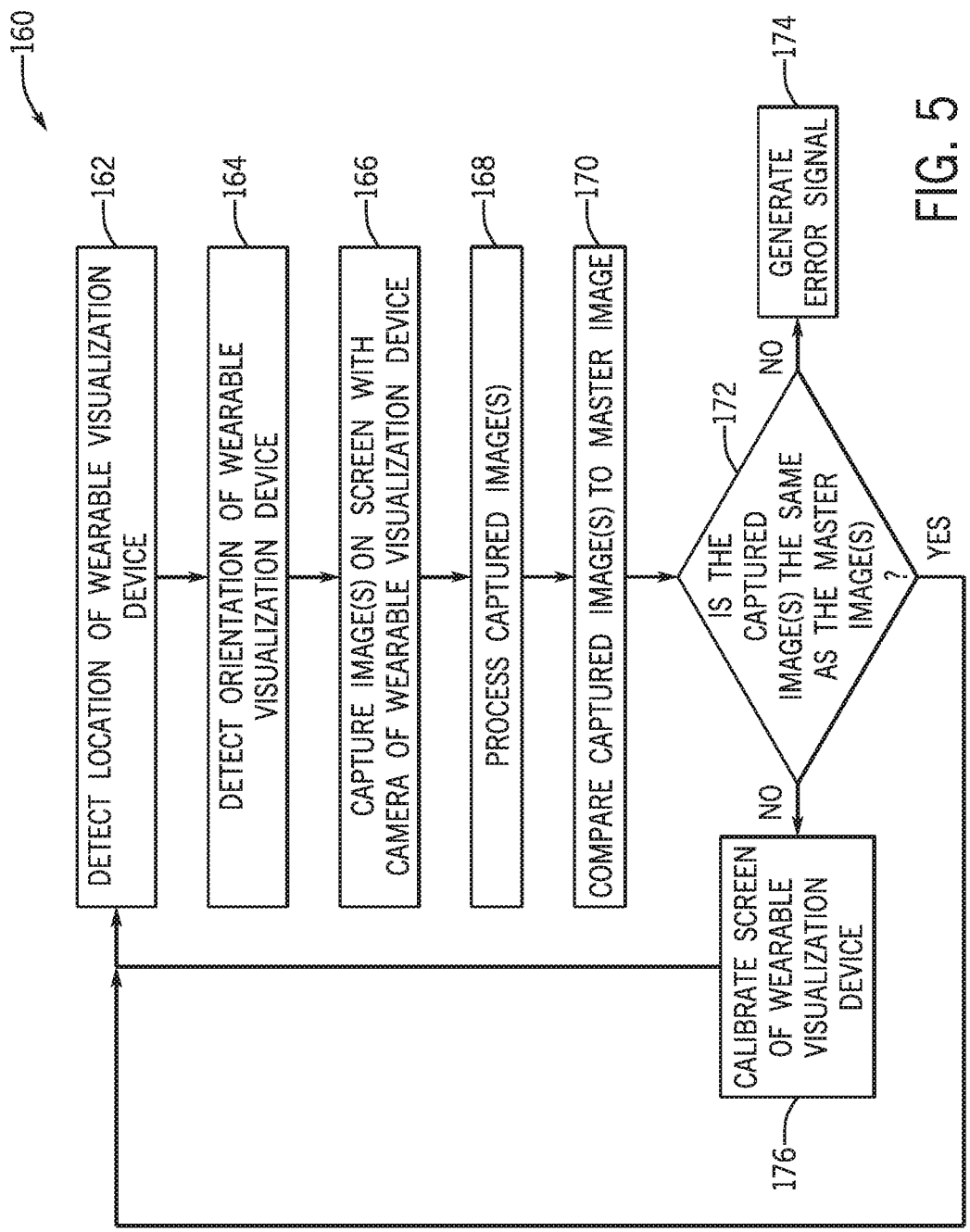
FIG. 5 is a flowchart of a method for calibrating a wearable visualization system during a ride, in accordance with an embodiment of the present disclosure.

FIG. 5 is a flowchart of a method 160 for testing a wearable visualization system 10 during a ride. The method 160 begins by detecting the location of the wearable visualization device 12, step 162. For example, the location of the wearable visualization device 12 may be a physical location of the wearable visualization device 12 along a ride path or track. Location of the wearable visualization device 12 may be determined using one or more sensors 68 on the wearable visualization device 12, sensors that monitor a position of the ride vehicle along the ride path or track, or other data. By determining the location of the wearable visualization device 12 along the ride path or track, the computer system 28 is able to determine what objects or scenes the user should be seeing on the displays 20 of the wearable visualization device 12. The method 160 may also determine the orientation of the wearable visualization device 12, step 164. During the ride, the user may look in different directions as the user takes in the AR/VR environment. By determining the orientation of the wearable visualization device 12, the computer system 28 is able to determine what portions of scenes or objects the user should be seeing on the displays 20 of the wearable visualization device 12. The orientation of the wearable visualization device 12 may be determined using the sensors 68 described above.

After determining the position and orientation of the wearable visualization device 12, the method 160 captures an image or a series of images on the displays 20 of the wearable visualization device 12 using one or more of the cameras 38, step 166. After capturing the image or images, the method 160 may process the captured image or images, step 168. For example, the cameras 38 may capture distorted images on the displays 20 because of the angle of the cameras 38 relative to the displays 20. The processing may therefore transform the image from a distorted image seen from the angle of the camera 38 to images that the user would see looking directly at the displays 20. However, in some embodiments the images may not be processed to correct for these kinds of distortions. For example, the computer system 28 may already include master images from the perspective of the camera enabling the captured images to be compared with these master images.

In order to determine whether the correct image is being displayed, the method 160 compares the captured image(s) to the master image(s), step 170. The computer system 28 is therefore able to determine differences between the captured image(s) and the master image(s). The comparison may reveal a variety of problems, including smudges on the displays 20 (through the detection of blurred portions of the captured images), reduction in brightness of the displays 20, malfunctioning pixels (e.g., stuck pixels, dead pixels), incorrect image production, incorrect image coloring, no image production, incorrect alignment of the virtual features on the displays 20 with the real-world environment viewed through the displays 20, among others. The master image(s) may be determined or selected (e.g., from multiple master images, which may be stored in the memory 36) based on (e.g., to correspond to, be correct for) the position and orientation of the wearable visualization device 12.

After comparing the images, the method determines if the captured image(s) is the same as (e.g., matches; is substantially similar to) the master image(s), step 172. If the captured image is the same as the master image (e.g., in response to the images being the same), the method 160 begins again (i.e., returns to step 162). For example, the method 160 may be repeated at specific intervals on the ride. These intervals may be time and/or location based. If the comparison determines that the images are not the same (e.g., in response to determining that the images are not the same), the method 160 calibrates the displays 20, step 176. In some embodiments, the method 160 may extract calibration parameters before calibrating the wearable visualization device 12. For example, the computer system 28 may adjust the timing of the image production if the images are out of sync with the timing and/or location on the ride. The computer system 28 may also adjust the coloring of the images to accurately or more accurately represent the desired image. For example, if the ability of the displays 20 to generate blue light is reduced, the computer system 28 may reduce the brightness of red light and yellow light to reduce the distortion of the images from the reduction of blue light. In some embodiments, if a dead pixel is detected near the edges of the display 20, the computer system 28 may shrink the image by turning off rows and/or columns of pixels around the edge of the displays 20 to block the user from seeing a dead pixel surrounded by active working pixels.

After calibrating the wearable visualization device 12 (step 176), the method 160 may return to step 162 to verify that the wearable visualization device 12 is now displaying the images correctly. If the image is still incorrect (e.g., in response to the captured image being different from the master image), the method 160 may then produce an error signal, step 174. The error signal may be a visual signal (e.g., red flashing light) and/or audio signal (e.g., request for inspection) generated on the wearable visualization device 12 or on another device (e.g., tablet, computer, cellphone, watch) accessible to the ride operator. The ride operator may then inspect, clean, and/or replace the wearable visualization device 12. In some embodiments, in response to the captured image being different (e.g., significantly different) from the master image (e.g., the captured image indicates that no image is displayed, that a large portion of the display has smudges, that a large portion of the pixels are malfunctioning, that the virtual image on the displays 20 does not align properly with the real-world environment viewed through the displays 20) at the comparison step (172), the method 160 may skip the calibration step (step 176) and may instead proceed to the error signal step (step 174).

Figure 6:
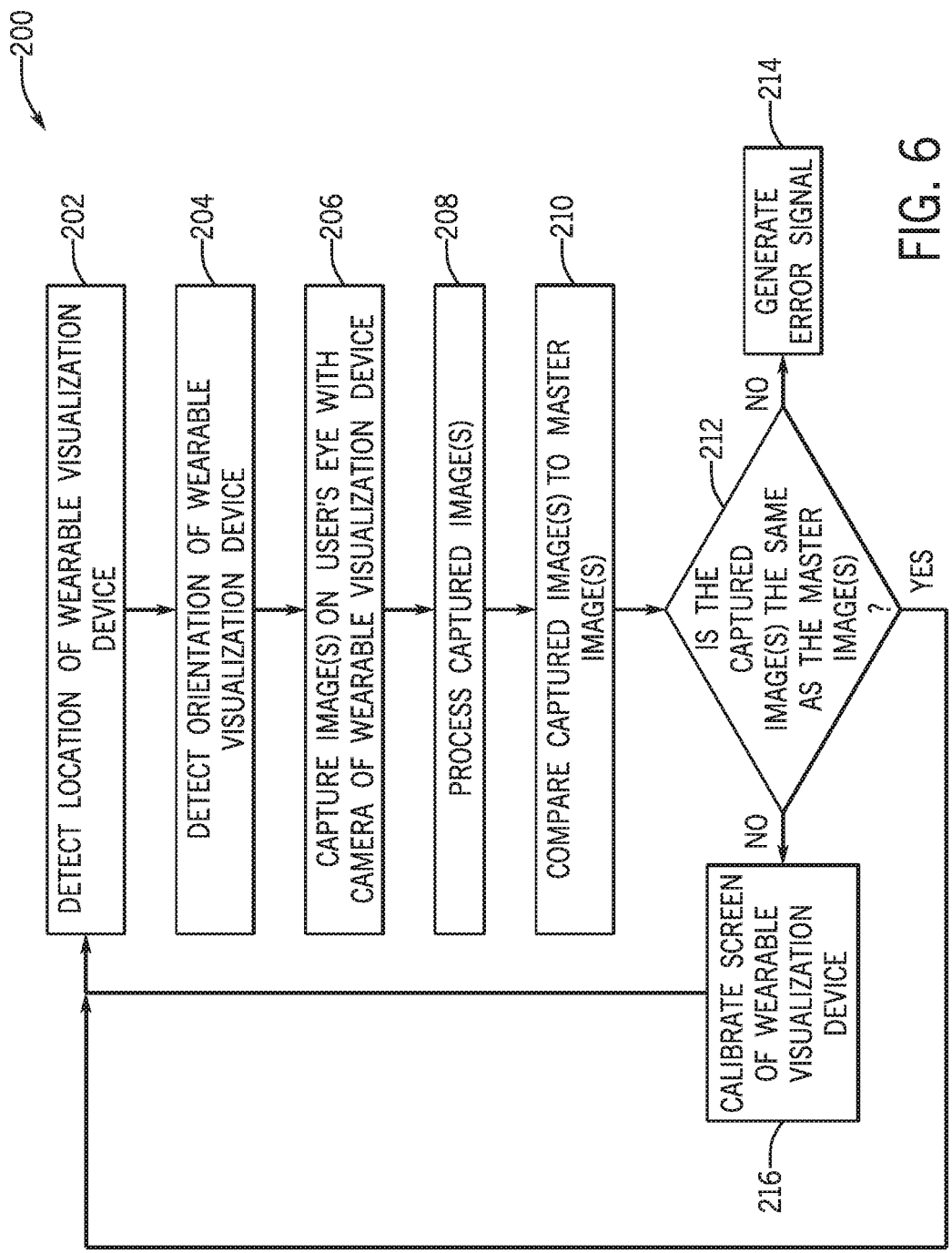
FIG. 6 is a flowchart of a method for calibrating a wearable visualization system during a ride, wherein the method includes capturing an image on a user's eye, in accordance with an embodiment of the present disclosure.

FIG. 6 is a flowchart of a method 200 for testing a wearable visualization system 10 during a ride. The method 200 begins by detecting the location of the wearable visualization device 12, step 202. For example, the location of the wearable visualization device 12 may be a physical location of the wearable visualization device 12 along a ride path or track. Location of the wearable visualization device 12 may be determined using one or more sensors 68 on the wearable visualization device 12, sensors that monitor a position of the ride vehicle along the ride path or track, or other data. By determining the location of the wearable visualization device 12 along the ride path or track, the computer system 28 is able to determine what objects or scenes the user should be seeing on the displays 20 of the wearable visualization device 12. The method 200 then determines the orientation of the wearable visualization device 12, step 204. During the ride, the user may look in different directions as the user takes in the AR/VR environment. By determining the orientation of the wearable visualization device 12, the computer system 28 is able to determine what portions of scenes or objects the user should be able to see with the wearable visualization device 12. The location and/or orientation of the wearable visualization device 12 may be determined using the sensors 68 described above.

After determining the position and orientation of the wearable visualization device 12, the method 200 captures an image or a series of images on the eye(s) of the user of the wearable visualization device 12 using one or more of the cameras 38, step 206. After capturing the image or images, the method 200 may process the image or images, step 208. Because the cameras 38 capture images on the eye of the user, the images are distorted because of the curvature of the user's eye(s), the processing may also enable the removal of the user's eye from the image (e.g., pupil, blood vessels). The processing may therefore transform the image from a distorted image seen by the camera(s) 38 to the images that the user is seeing on the displays 20.

In order to determine whether the correct image is being displayed, the method 200 compares the captured image(s) to the master image(s), step 210. In this way, the computer system 28 is able to determine differences between the captured image(s) and the master image(s). The comparison may reveal a variety of problems, including smudges on the displays 20 (through the detection of blurred portions of the captured image(s)), reduction in brightness of the displays 20, malfunctioning pixels (e.g., stuck pixels, dead pixels), incorrect image production, incorrect image coloring, no image production, incorrect alignment of the virtual features on the displays 20 with the real-world environment viewed through the displays 20, among others.

After comparing the images, the method 200 determines if the captured image is the same as (e.g., matches; is substantially similar to) the master image(s), step 212. If the captured image is the same as the master image(s) (e.g., in response to the images being the same), the method 200 returns to the beginning (i.e., returns to step 202). For example, the method 200 may be repeated at specific intervals on the ride. These intervals may be time and/or location based. If the comparison determines that the images are not the same (e.g., in response to determining that the images are not the same), the method 200 calibrates the displays 20, step 216. In some embodiments, the method 200 may extract calibration parameters before calibrating the wearable visualization device 12. For example, the computer system 28 may adjust the timing of the image production if the images are out of sync with the timing and/or location on the ride. The computer system 28 may also adjust the coloring of the images to accurately or more accurately represent the desired image. For example, if the ability of the displays 20 to generate blue light is reduced, the computer system 28 may reduce the brightness of red light and yellow light to reduce the distortion of the images from the reduction of blue light. After calibrating the wearable visualization device 12 (step 134), the method 200 may return to step 202 to verify that the wearable visualization device 12 is now displaying the images correctly. After passing through the steps of the method 200 and the images are still incorrect (e.g., in response to the captured image being different from the master image), the method 200 may then produce an error signal, step 214. The error signal may be a visual signal (e.g., red flashing light) and/or audio signal (e.g., request for inspection) generated on the wearable visualization device 12 or on another device (e.g., tablet, computer, cellphone, watch) accessible to the ride operator. The ride operator may then inspect, clean, and/or replace the wearable visualization device 12. In some embodiments, in response to the captured image being different (e.g., significantly different) from the master image (e.g., the captured image indicates that no image is displayed, that a large portion of the display has smudges, that a large portion of the pixels are malfunctioning, that the virtual image on the displays 20 does not align properly with the real-world environment viewed through the displays 20) at the comparison step (212), the method 200 may skip the calibration step (step 216) and may instead proceed to the error signal step (step 214).

In some embodiments, the computer system 28 may collect data after performing the methods described above in FIGS. 4-6 to enable the preventative maintenance of the wearable visualization devices 12 (e.g., cleaning, refurbishment). In other words, the computer system 28 may measure time to failure by collecting data on the operation of the wearable visualization devices 12 using feedback from the cameras 38. For example, the computer system 28 may track the gradual decrease in brightness of the displays 20 over time. This may enable proactive scheduling of refurbishment or replacement of the devices 20 before failure on a ride. In another embodiment, the computer system 28 may determine how often the displays 20 should be cleaned by determining after how many uses of the wearable visualization devices 12 the accumulated smudges significantly affect a user's perception. In this way, the computer system 28 may use feedback over time from the cameras 38 to determine time to failure or preventative maintenance needs for a variety of components (e.g., cables, displays) of the wearable visualization devices 12. In some embodiments, the multiple wearable visualization devices 12 may be tracked with an interface or application that provides easily accessible data to a ride operator.

As set forth above, embodiments of the present disclosure may provide one or more technical effects useful for detecting the malfunction of a wearable visualization device. It should be understood that the technical effects and technical problems in the specification are examples and are not limiting. Indeed, it should be noted that the embodiments described in the specification may have other technical effects and can solve other technical problems.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. § 112(f).

The invention claimed is:

1. A wearable visualization system, comprising:
a wearable visualization device, comprising:
a housing;
a display coupled to the housing and configured to display an image for a user; and
a camera coupled to the housing and configured to capture the image; and
a computer system configured to:
receive the image from the camera;
determine an orientation of the wearable visualization device relative to a gravity vector;
determine a master image that corresponds to the orientation of the wearable visualization device; and
compare the image to the master image to determine if the image matches the master image.

2. The wearable visualization system of claim 1, wherein the computer system is configured to control the display in response to the comparison between the image and the master image.

3. The wearable visualization system of claim 1, wherein the camera is oriented toward the display.

4. The wearable visualization system of claim 1, wherein the camera is oriented in a direction away from the display, and the camera is configured to capture the image on an eye of the user.

5. The wearable visualization system of claim 4, wherein the computer system is configured to process the image to remove distorting effects of eye curvature and eye image.

6. The wearable visualization system of claim 1, wherein the wearable visualization device comprises one or more sensors.

7. The wearable visualization system of claim 6, wherein the wearable visualization device is configured to use feedback from the one or more sensors to determine the orientation of the wearable visualization device.

8. The wearable visualization system of claim 1, wherein the image is a test image comprising one or more patterns.

9. A method of calibrating a wearable visualization system, the method comprising:
detecting, with a computer system, an orientation of a wearable visualization device;
capturing, with a camera, an image produced on a display of the wearable visualization device;
determining, with the computer system, a master image in response to the orientation of the wearable visualization device; and
comparing, with the computer system, the image to the master image to determine that the image matches the master image.

10. The method of claim 9, comprising determining, with the computer system, a location of the wearable visualization device.

11. The method of claim 10, comprising determining, with the computer system, the master image using the location of the wearable visualization device.

12. The method of claim 9, comprising controlling, with the computer system, the display in response to comparing, with the computer system, the image to the master image.

13. The method of claim 9, wherein capturing, with the camera, the image produced by the display comprises capturing, with the camera, the image directly from the display.

14. The method of claim 9, wherein capturing, with the camera, the image produced by the display comprises capturing, with the camera, the image from an eye of a user.

15. The method of claim 14, comprising processing, with the computer system, the image to remove distorting effects of eye curvature and eye image.

16. A method of calibrating a wearable visualization system, the method comprising:
detecting, with a computer system, an operation of a wearable visualization device during an amusement park ride;
capturing, in response to detecting the operation of the wearable visualization device and with a camera, a test image produced on a display of the wearable visualization device during the amusement park ride; and
comparing, with the computer system, the test image captured by the camera to a master image to determine that the test image matches the master image by determining that:
a color difference between the test image and the master image is within a threshold color difference;
a brightness difference between the test image and the master image is within a threshold brightness difference;
a number of dead pixels in the test image relative to the master image is within a threshold number of dead pixels;
a blurriness of the test image relative to the master image is within a threshold blurriness difference; or
a combination thereof.

17. The method of claim 16, comprising generating, with the computer system, a ready signal in response to determining, with the computer system, that the test image matches the master image, wherein the ready signal is accessible to a ride operator of the amusement park ride.

18. The wearable visualization system of claim 1, wherein the computer system is configured to:
receive an indication of a location of the wearable visualization device along a ride path in an amusement park ride; and
determine the master image that corresponds to the orientation of the wearable visualization device and the location of the wearable visualization device.

19. The method of claim 16, wherein detecting, with the computer system, the operation of the wearable visualization device comprises determining that the wearable visualization device is stored in a storage location, and the method comprises:
instructing, with the computer system, the display of the wearable visualization device to produce the test image in response to detecting that the wearable visualization device is stored in the storage location.

20. The method of claim 16, wherein the test image includes an image overlaid on an environment of the amusement park ride.

* * * * *